United States Patent
Latham et al.

(10) Patent No.: US 9,674,045 B2
(45) Date of Patent: Jun. 6, 2017

(54) METHODS, SYSTEMS, AND COMPUTER READABLE MEDIA FOR MODELING PACKET TECHNOLOGY SERVICES USING A PACKET VIRTUAL NETWORK (PVN)

(71) Applicant: Oracle International Corporation, Redwood Shores, CA (US)

(72) Inventors: Lee Latham, Plano, TX (US); Eamon O'Grady, Old Portmarnock (IE); Timothy Matt, Frisco, TX (US); David C. Campbell, Allen, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 82 days.

(21) Appl. No.: 14/569,406

(22) Filed: Dec. 12, 2014

(65) Prior Publication Data

US 2016/0173340 A1 Jun. 16, 2016

(51) Int. Cl.
*H04L 12/24* (2006.01)
*H04L 12/46* (2006.01)

(52) U.S. Cl.
CPC ........ *H04L 41/145* (2013.01); *H04L 12/4641* (2013.01); *H04L 12/4654* (2013.01);
(Continued)

(58) Field of Classification Search
None
See application file for complete search history.

(56) References Cited

U.S. PATENT DOCUMENTS 7,864,763 B2* 1/2011 Yi .............. H04L 12/4679
370/389
8,868,745 B1* 10/2014 Muley ............. H04L 63/0272
709/223
(Continued)

OTHER PUBLICATIONS

Commonly-assigned, co-pending U.S. Patent Application for "Methods, Systems, and Computer Readable Media for Configuring Service Networks," (Unpublished, filed Dec. 12, 2014).
(Continued)

*Primary Examiner* — Chi H Pham
*Assistant Examiner* — Soon-Dong D Hyun
(74) *Attorney, Agent, or Firm* — Jenkins, Wilson, Taylor & Hunt, P.A.

(57) ABSTRACT

Methods, systems, and computer readable media for modeling packet technology services using a packet virtual network (PVN) are provided. In some aspects, and at a computing platform, a method includes providing a plurality of flow interface objects. Each flow interface object can be associated with a physical device. The method further includes configuring the flow interface objects into a PVN, wherein the flow interface objects represent network devices or device sub-interfaces. The method further includes displaying the PVN for visually modeling an Ethernet and/or a non-Ethernet packet technology service. An exemplary system includes a computing platform having at least one processor and a memory, the computing platform being configured to access a plurality of flow interface objects stored in the memory and a PVN)-modeling module (PVN-MM) for grouping the flow interface objects into a PVN for modeling a service.

25 Claims, 7 Drawing Sheets (52) U.S. Cl.
CPC ...... *H04L 12/4658* (2013.01); *H04L 41/0803* (2013.01); *H04L 41/22* (2013.01)

(56) References Cited

U.S. PATENT DOCUMENTS

| | | | |
|---|---|---|---|
| 2005/0021742 A1* | 1/2005 | Yemini | G06Q 10/04 709/224 |
| 2009/0180493 A1* | 7/2009 | Hirano | H04L 12/185 370/464 |
| 2009/0210523 A1* | 8/2009 | Duggan | H04L 41/12 709/223 |
| 2010/0271955 A1 | 10/2010 | Atsumi | |
| 2011/0254704 A1* | 10/2011 | Fournier | G06F 11/0739 340/945 |
| 2013/0283175 A1* | 10/2013 | Faridian | H04L 67/1095 715/736 |
| 2015/0049641 A1 | 2/2015 | Pugaczewski | |
| 2015/0117195 A1 | 4/2015 | Toy | |
| 2015/0156108 A1 | 6/2015 | Shi | |
| 2016/0173329 A1 | 6/2016 | Latham et al. | |
| 2016/0173342 A1 | 6/2016 | Latham et al. | |

OTHER PUBLICATIONS

Commonly-assigned, co-pending U.S. Patent Application for "Methods, Systems, and Computer Readable Media for Configuring a Flow Interface on a Network Routing Element," (Unpublished, filed Dec. 12, 2014).

"IEEE 802.1ad," http://en.wikipedia.org/wiki/IEEE_802.1ad, pp. 1-4 (Jul. 18, 2014, Downloaded from the Internet Dec. 12, 2014).

Appendix A, "Setting Up VLAN Translation," Cisco IP Solution Center L2VPN User Guide, 4.1 http://www.cisco.com/en/US/docs/net_mgmt/ip_solution_center/4.1/l2vpn /user/guide/vlantran. html, pp. 1-8, (2005).

Chapter 13, "Configuring VLANs," Catalyst 2950 Desktop Switch Software Configuration Guide, http://www.cisco.com/c/en/us/td/docs/switches/lan/catalyst2950 /software/release/12-1 9 ea1/configuration/guide/scq/swvlan.html#wp1274639, pp. 1-38, (Apr. 2002).

"Virtual private network," http://en.wikipedia.org/wiki/Virtual_private_network, pp. 1-6 (Dec. 3, 2014, Downloaded from the Internet Dec. 11, 2014).

"Vision and Strategy Based on Network as a Service Principles," MEF TheThirdNetwork Agile, Assured, Orchestrated, http://www.metroethernetforum.org/Assets/Documents/MEF_Third_Network_Vision_FINAL.pdf, pp. 1-17 (Nov. 2014).

"MEF Technical Specification," MEF 12.2, Carrier Ethernet Network Architecture Framework Part 2: Ethernet Services Layer, http://www.metroethernetforum.org/Assets/Technical_Specifications/PDF/MEF12.2.pdf, pp. 1-60 (May 2014).

"MEF Technical Specification," MEF 10.3, Ethernet Services Attributes Phase 3, https://www.metroethernetforum.org/Assets/Technical_Specifications/PDF/MEF_10.3.pdf, pp. 1-113 (Oct. 2013).

"Ethernet Virtual Connections (EVCs)," Cisco IOS Software Configuration Guide, Release 12.2SY, Chapter 38, http://www.cisco.com/c/en/us/td/docs/switches/lan/catalyst6500/ios/12-2SY/configuration/guide/sy_swcg/ethernet_virtual_connection,pdf, pp. 38-1-38-14 (Sep. 28, 2013).

"MEF Technical Specification," MEF 10.2, Ethernet Services Attributes Phase 2, http://www.metroethernetforum.org/Assets/Technical_Specifications/PDF/MEF10.2.pdf, pp. 1-59 (Oct. 2009).

"MEF Technical Specification," MEF 4, Metro Ethernet Network Architecture Framework—Part 1: Generic Framework, http://www.metroethernetforum.org/Assets/Technical_Specifications/PDF/MEF4.pdf, pp. 1-26 (May 2004).

Oracle Communications Unified Inventory Management, Oracle Data Sheet, http://www.oracle.com/us/industries/communications/045545.pdf, pp. 1-5 (2012).

"Functional Design UIM Core—Packet Connectivity—Phase II InvRmiS0373," Communications Information Suite SR3, 4.3 Final Rev. 7, Oracle p. 1-141 (May 27, 2014).

O'Grady, "SR3 Packet Connectivity Overview," Oracle p. 1-35 (Sep. 11, 2013).

Non-Final Office Action for U.S. Appl. No. 14/569,589 (Nov. 17, 2016).

* cited by examiner

| MODELING OBJECTS/ITEMS | |
|---|---|
| VIRTUAL NODES | VIRTUAL EDGES/TERMINATIONS |
| FLOW INTERFACE 1 | ACCESS CONNECTIVITY |
| FLOW INTERFACE 2 | INTERNETWORK CONNECTIVITY |
| FLOW INTERFACE 3 | TRUNK CONNECTIVITY |
| ⋮ | ⋮ |

METHODS, SYSTEMS, AND COMPUTER READABLE MEDIA FOR MODELING PACKET TECHNOLOGY SERVICES USING A PACKET VIRTUAL NETWORK (PVN)

CROSS-REFERENCE TO RELATED APPLICATIONS

This application relates to U.S. patent application Ser. No. 14/569,591, entitled METHODS, SYSTEMS, AND COMPUTER READABLE MEDIA FOR CONFIGURING SERVICE NETWORKS, filed on Dec. 12, 2014, and U.S. patent application Ser. No. 14/569,589, entitled METHODS, SYSTEMS, AND COMPUTER READABLE MEDIA FOR CONFIGURING A FLOW INTERFACE ON A NETWORK ROUTING ELEMENT, filed on Dec. 12, 2014.

TECHNICAL FIELD

The subject matter described herein relates to telecommunication packet technology services, and more specifically, to methods systems, and computer readable media for modeling packet technology services using a packet virtual network (PVN).

BACKGROUND

Packet services and carrier Ethernet services for providing enterprise services associated with voice, video, and/or data packets are experiencing widespread market adoption. "Packet services" generally refer to services provided over packet networks. "Carrier Ethernet services" refers to services provided by telecommunications network providers (carriers) using Ethernet technology in their networks. Carrier Ethernet services can thus be considered a subset of packet services.

With the increased popularity of packet service technology, bandwidth demands are growing, which in part is leading to increased demands for enterprise service automation. Carrier Ethernet services are also one of the foundation technologies for new enterprise services, such as cloud data center services, Long-Term Evolution (LTE) mobile communications, and other packet technology services, which are also experiencing widespread market adoption.

In efforts to manage existing packet technology services and service connectivity, providers must rely on network engineers or administrators for providing custom designed solutions for service configuration and packet network connectivity. This requires extensive manual software design, labor intensive coding, and technology specific modeling prior to network activation. Such services are expensive to provide, time consuming, and slow to deploy.

To date, there is not an agnostic, technology independent "click-and-go" approach for service design, configuration, and/or packet connectivity for all major packet based domains. Technology independent models are desired for supporting packet flow inspection, shaping, and configuration at any access point in a packet based network. In addition to this, systems and methods for visual design support and/or adequate modeling for complex multipoint-to-multipoint (MP2MP) services for all major packet based domains do not currently exist.

Accordingly, and in light of these difficulties, a need exists for improved methods, systems, and computer readable media for modeling packet technology services.

SUMMARY

Methods, systems, and computer readable media for modeling packet technology services are disclosed. One method, which occurs at a computing platform, the method includes providing a plurality of flow interface objects. Each flow interface object is associated with a physical device. The method further includes configuring the flow interface objects into a packet virtual network (PVN), wherein the flow interface objects represent network devices or device sub-interfaces. The PVN visually models an Ethernet and/or a non-Ethernet packet technology service. In some embodiments, providing a plurality of flow interface objects includes providing a plurality of data structure attributes. The attributes include at least one of a location code, a bit-rate code, or an identification code. The method may further comprise providing a plurality of connectivity objects. The plurality of connectivity objects includes providing a plurality of data structure attributes in a table or a resource pool.

According to one system, the system includes a computing platform comprising at least one processor and a memory. The computing platform is configured to access a plurality of flow interface objects stored in the memory. Each flow interface object being associated with a physical device. The system further includes a PVN-modeling module (PVN-MM) configured to group the flow interface objects into a PVN, wherein the flow interface objects represent network devices or device sub-interfaces, and wherein the PVN-MM is configured to visually display the PVN to model an Ethernet and/or a non-Ethernet packet technology service.

The subject matter described herein may be implemented in software in combination with hardware and/or firmware. For example, the subject matter described herein may be implemented in software executed by a hardware processor. In one exemplary implementation, the subject matter described herein may be implemented using a computer readable medium having stored thereon computer executable instructions that when executed by the hardware processor of a computer control the computer to perform steps. Exemplary computer readable media suitable for implementing the subject matter described herein include hardware, non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "computing platform" refers to a physical computing platform including one or more hardware processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for modeling packet technology services using one or more packet virtual networks (PVNs). When configuring packet technology services (e.g., for providing website services; Internet services; voice, video, and/or data services; etc.), systems and methods herein include providing technology independent (e.g., agnostic) models for modeling packet flow inspection, shaping, and/or configuration at any access point in a packet based network or domain. Modeling systems and methods herein support calculation of change configuration actions to manage complex enterprise service change at a particular ingress/egress or intermediate point in the network.

Modeling systems and methods herein utilize virtual modeling objects for representing service nodes (e.g., node devices and/or node device sub-interfaces) and flows between service nodes (e.g., edges and/or connectivity). The virtual objects may include logical devices (e.g., nodes) and connectivity (e.g., edges) to virtual terminations that are mapped or otherwise linked to physical nodes (e.g., servers, ports, cables, routers, switches, etc.) at various physical customer sites and/or service locations.

In some embodiments, PVNs disclosed herein include virtual network abstractions for modeling complex enterprise multipoint-to-multipoint (MP2MP) telecommunication packet technology services. PVNs are flexible enough to model Ethernet packet based connectivity services (e.g., Ethernet Virtual Circuit (EVC); Operator Virtual Circuit (OVC)) and non-Ethernet packet based connectivity services (e.g., Cloud data services; Asynchronous Transfer Mode (ATM) services; Long-Term Evolution (LTE) services; Software Defined Networking (SDN) services; etc.). In some embodiments, PVNs provide a single integrated solution for enabling Carrier Service Providers (CSPs) to model a respective full telecommunication packet based connectivity service and resource inventory in a single system. PVNs provide CSPs with the tools to manage capacity and plan the evolution, configuration, and/or upgrading of their respective network for enabling them to profitably manage existing capacity for servicing existing customer services.

The management of resources for capacity and servicing planning capabilities may include virtual management and design of a model PVN. The model PVN enables CSPs to manipulate and visually model various packet flows and/or enterprise service flows within a PVN. Modeling packet flows between nodes (connection points) and/or edges within a PVN may include connecting logical abstractions of the actual physical, existing entities and connections using "virtual" modeling objects that are generated and stored within a modeling database prior to the actual implementation and/or deployment of the service network. Virtual modeling objects may be pre-defined (e.g., default, out of the box) objects, custom extended objects, and/or new user-defined objects used to generate a PVN.

Notably, PVNs provide a systematic approach for grouping virtual nodes (e.g., flow interfaces) and virtual edges (e.g., connectivity flows) for representing a specific service implementation, which is in an Ethernet or non-Ethernet packet technology domain. PVNs improve the scalability of a provider's network by providing an additional logical layer between the infrastructure network and the service. This allows full support for multipoint services and provides configuration capabilities for tracking and managing changes to the network.

As used herein the terms "designing" or "modeling" a service generally refer to abstracting the connection of infrastructure at physical client service location(s) to infrastructure of a service provider network, in the form of a PVN. The client service location or customer site represents the customer facing origination point for a service. In some aspects, a client requesting a service may have one or more (e.g., multiple) service locations. In order to connect the client service locations to the destination point of the provider network, various resources may need to be virtually modeled to assure provision of the necessary connections prior to deploying the service network. Modeling may include accessing virtual nodes and/or edges, each representing different types of resources, such as devices (nodes) and/or the flows between node devices (edges). The nodes and/or edges to be modeled in a PVN may include a single unit or portion of a service network.

Notably, modeling systems and methods herein utilize technology-independent (e.g. agnostic abstractions) PVNs for providing the rapid fulfillment of new services, enabling visual service design (e.g., which is needed for complex MP2MP enterprise services), and allowing CSPs to allocate and reserve resources for enterprise service tender response bids and rapid deployment of packet based technologies. PVNs shown and described herein utilize packet flow modeling and connectivity for supporting network utilization, network service demand forecasting, and network planning.

In accordance with some embodiments of the subject matter described herein, a PVN may be represented by one or more configurable modeling objects or sub-objects. Modeling objects may include logical abstractions representing existing devices and/or sub-interfaces thereof (nodes) and/or connectivity (edges) there between, which have been pre-configured or mapped to physical hardware devices using computer code or software in advance of performing or emulating one or more aspects associated with packet based services or networks.

In some embodiments, a modeling object includes one or more data objects (e.g., data structures) representing a logical sub-interface (e.g., flow-interface), and/or packet connectivity (e.g., cross-connects, modeling access, inter-network, and/or trunk connectivity). In this example, modeling a packet technology service via PVN modeling objects may include configuring each of the objects into a logical and/or "virtual" network abstraction of a generic (agnostic) service flow. PVNs may be used to model and, therefore, visualize Ethernet and non-Ethernet packet based technologies.

In some embodiments, a user interface allows one of more PVN modeling users (e.g., an operator, service or network designer, test engineer, etc.) to configure (e.g., logically connect and model) each modeling object from a database of modeling objects. After configuring the various objects, a computing platform or device may compile, group, and/or connect the objects into a PVN, which is a network abstraction allowing a user to visually emulate and model a packet based technology service network.

In some embodiments, modeling objects and/or related sub-objects may be stored and/or used for future PVN modeling or emulation. Hence, by representing packet connection nodes and edges into a single, virtual network unit or system (e.g., a PVN) using one or more objects, services may be modeled efficiently for a variety of CSPs, regardless of the type of packet based technology. Modeling systems and methods herein also accommodate changes at various ingress/egress and intermediate points in the network, should a set of configurations (parameters) associated with various network flow interfaces change, to support a calculation of change configuration actions, as needed. Thus, PVNs are also mechanisms for modeling change management and/or infrastructure (topology) change within a service network.

As used herein, the term "flow interface" refers to a logical sub-interface entity or virtual node for tracking flow identifiers (e.g., VLAN IDs for Ethernet) through the network. A "flow interface" is a logical point in the network through which traffic flows through, and always has a physical device interface parent associated therewith. Flow interfaces refer to generic interfaces representing nodes or edges through which data/media packets flow, the flow interfaces being objects that are mapped and stored within a database and/or provisioned thereto, for use as modeling objects or sub-objects.

As used herein, the term "flow identifiers" refers to generic attribute values for supporting or tracking the flow of traffic through a flow interface. Examples of flow identifiers include Virtual Local Area Network (VLAN) IDs and stacking of identifiers for Ethernet, Virtual Path Identifiers (VPIs) or Virtual Channel Identifiers (VCIs) for ATM services, Data Link Connection Identifiers (DLCIs) for Frame Relay, and/or any other virtual channel identifier such as Virtual Private LAN Service (VPLS) IDs for Multiprotocol Label Switching (MPLS). Flow identifiers, in general, are an abstract representation of parameters (e.g., VLAN ID) that traverse through a PVN to identify the service so that the packet can be routed at each flow interface. Flow identifiers may be managed or unmanaged. Provider-managed flow identifiers are created as part of infrastructure readiness and grouped into domains and resource pools from which they can be selected for assignment to PVNs.

As used herein, the term "Packet Virtual Network" (PVN) refers to a generic, agnostic, and technology-independent network abstraction including modeling a group or set of logical packet flow interfaces together into a single network unit. The flow interfaces have physical parent media interfaces, and are stored in a modeling database for use in modeling. PVNs can be used to model complex enterprise multiple end point telecommunicates packet technology service. Thus, the term "PVN" refers to a technology agnostic concept designed for modeling packet based networks. In the most basic form, a PVN is a set of related flow interfaces for flexibly modeling many different, technology-independent virtual networks. PVNs as described herein may include only nodes (flow interfaces) or nodes and edges (connectivity flows between flow interfaces). This provides flexibility in the depth of modeling that a service designer can provide in the service design.

As used herein, the term "service" refers to any type of packet based technology service provided by network provider for a customer (e.g., one customer, a customer site, and/or at a customer location). A service may include, and is not limited to the provision of Internet services, Web services, streaming services (e.g., audio/video (A/V) streaming), Electronic-Mail (E-Mail) services, phone (voice) services, Voice over IP (VoIP) services, Direct Internet Access (DIA), Internet Protocol (IP) Television (IPTV), Virtual Private Network (VPN), and/or any packet carrying, delivery, and/or transport services associated with voice, video, and/or data packets.

Reference will now be made in detail to exemplary embodiments of the subject matter described herein, examples of which are illustrated in the accompanying drawings. Where possible, the same reference numbers will be used throughout the drawings to refer to the same or like parts.

Figure 1A:
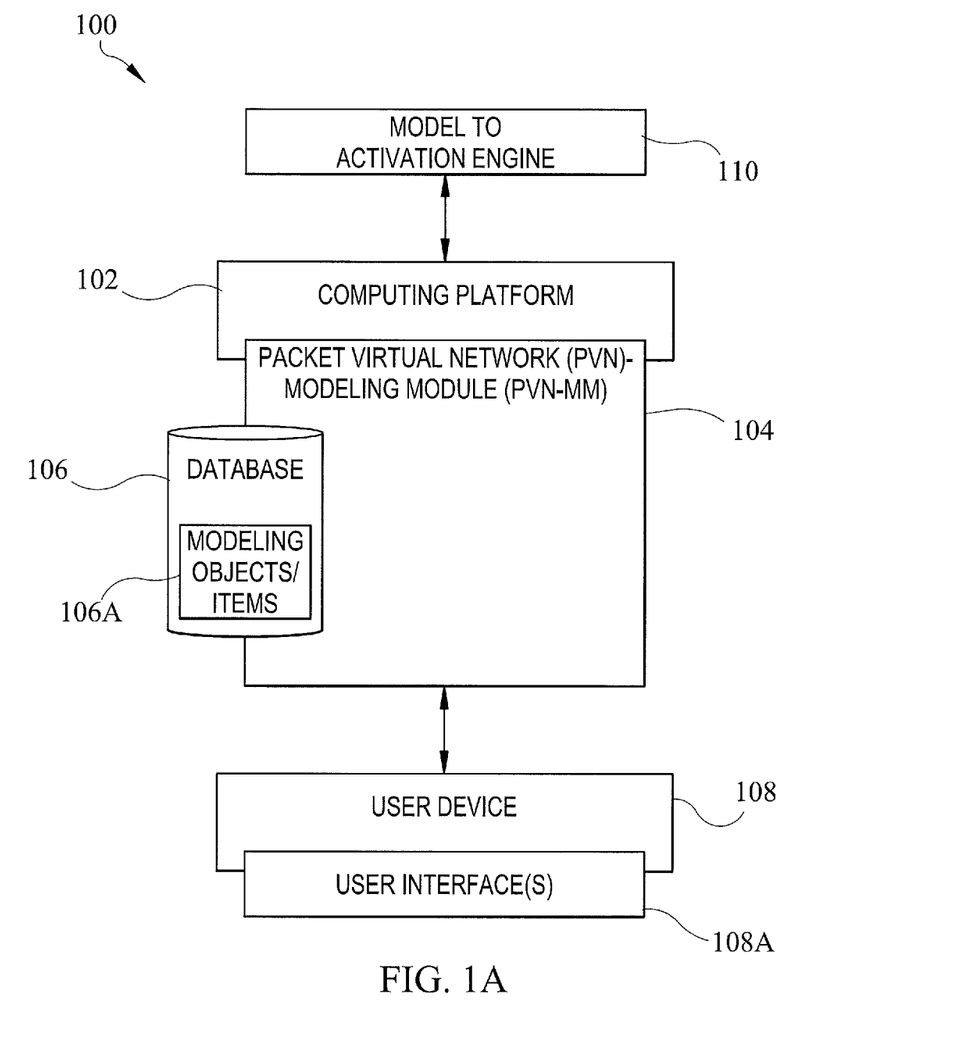
FIG. 1A is a diagram illustrating an exemplary computing platform for modeling packet technology services according to an embodiment of the subject matter described herein.

FIG. 1A is a diagram illustrating an exemplary system 100 for modeling a packet based technology service by generating a PVN model according to an embodiment of the subject matter described herein. System 100 includes a computing platform 102 having a PVN-modeling module (PVN-MM) 104 installed and/or provided thereon. Computing platform 102 represents any suitable entity or entities (e.g., a computer, a modeling platform, a core platform, a monitoring and/or testing platform, a server farm, etc.) for modeling and/or emulating packet services within a PVN (FIGS. 3 to 4B), which is a technology-independent (agnostic) network abstraction. PVNs may be used in modeling the design, configuration, and/or packet connectivity for all major packet based domains.

In some embodiments, computing platform 102 may model packet based technology services, not limited to enterprise services, via generation of a model using PVN-MM 104. In some embodiments, PVN-MM 104 groups, connects, and/or displays modeling objects thereby providing a visual support model of service and resource management, built on industry standards. Upon generating a visual model of a PVN (FIGS. 3 to 4B), computing platform 102 is configured to emulate the rapid design and efficient delivery of customer-centric services, as well as managing the current and next-generation resources and technologies.

In some embodiments, computing platform 102 may be configured to perform one or more aspects associated with modeling a PVN. In some embodiments, computing platform 102 may be a stand-alone modeling and emulation tool or modeling and emulation software stored in memory and executed on a processor. System 100 may include a single node (e.g., packet connection point) or multiple nodes distributed across multiple computing platforms 102.

In some embodiments, PVN-MM 104 may include any suitable entity (e.g., software executing on a processor, an application, a technology pack of a program executing on a processor, etc.) provided or installed on computing platform 102 for performing one or more aspects associated with packet service technology modeling and/or service emulation. PVN-MM 104 may include functionality for generating and modeling a PVN (FIGS. 3 to 4B) upon accessing a database 106 having one or more modeling objects or items 106 stored therein. Modeling objects 106A may include a resource pool of virtual objects that are stored and/or provisioned within database 106.

In some embodiments, modeling objects 106A include virtual nodes (flow interfaces) and/or edges (connectivity or terminations), which are logically defined or configured for representing actual (existing) physical hardware devices across an entire provider's network, for example, by modeling access, edge, and core logical flow interfaces and connections there between. Modeling objects 106A may be generically identified and/or named/identified by PVN-MM 104 based upon any number of technology-independent attributes. For example, modeling objects 106A may be identified by various resource attributes, including what purpose the virtual node serves (e.g., access point or connect, trunk connect, internetwork connect etc.), whether the virtual node is at customer site or a service location (e.g., generic "C-Tag/CE-VLAN" for customer or "S-Tag/SP-VLAN" for service), a rate code (e.g., 1G, 10G, etc.), and/or location details. By accessing and interfacing with PVN-MM 104, a modeling user can "click" to add/connect virtual nodes for a service design. PVN-MM 104 is configured to simplify the automation or semi-automation of services for packet based technologies, by providing resource modeling concepts that can inherently be used as the resource building blocks for the semi-automated design, provisioning, upgrading, downgrading, or augmentation of technology services provided by a given CSP or enterprise.

Notably, PVN-MM 104 is configured to generate PVN models using generically defined modeling objects 106A indicative of physical parent media interfaces, which are configured from attributes, queried, and accessed from database 106 (e.g., via a lookup table, a search, selection from a drop-town box, etc.) for visually modeling services associated with any and/or all telecom software providers that use packet based technologies. In addition to providing functionality for selecting, accessing, and/or configuring model-related objects, PVN-MM 104 may also include functionality for utilizing database 106 to replace, revise, save, and/or store changes to existing modeling objects 106A for future use. PVN-MM 104 may access and configure model-related objects upon receiving instructions/signals sent from a model user (e.g., operator, technician, designer, engineer, etc.) via an interface for emulating and modeling a service network and/or for providing the modeling objects to other computing platforms for emulating and modeling the service network.

Figure 3:
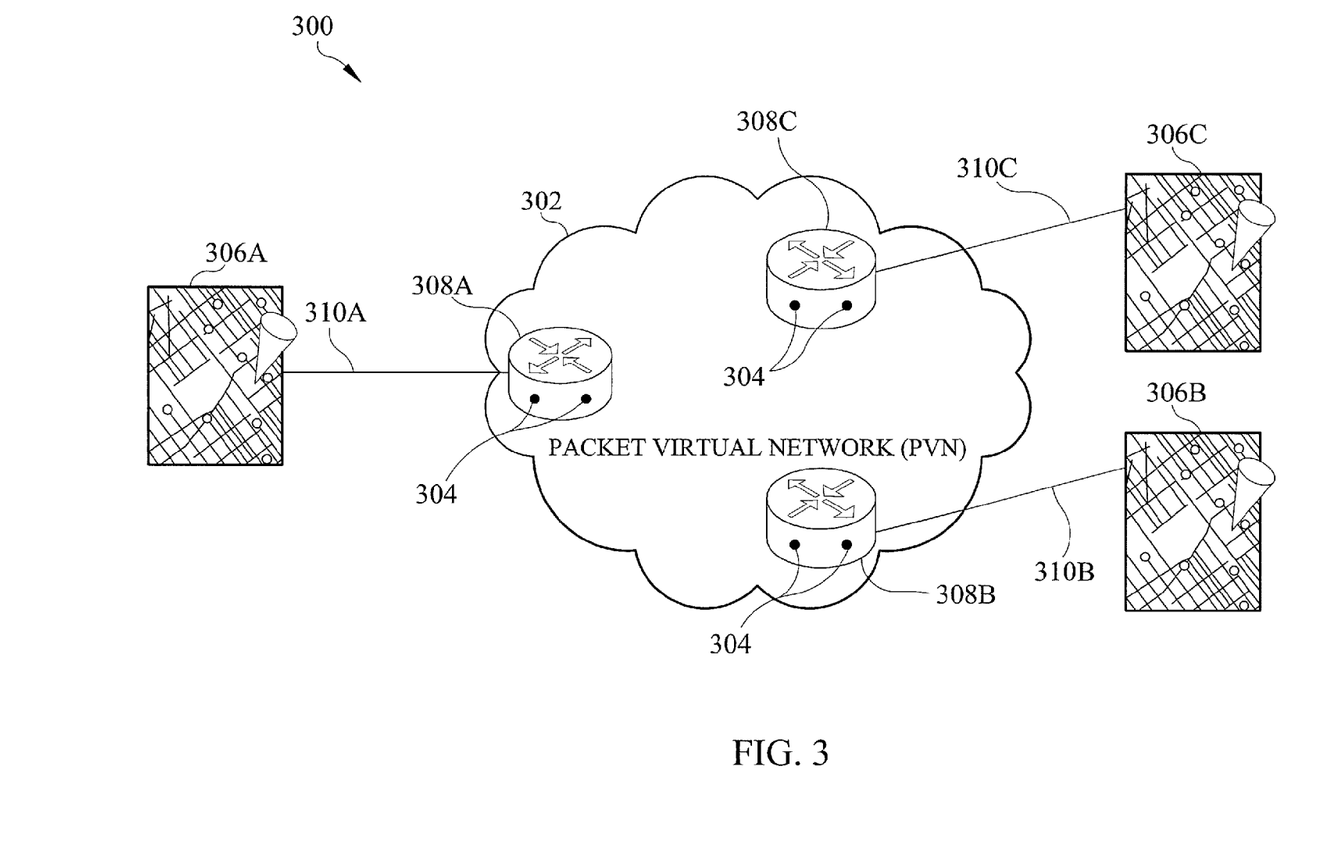
FIG. 3 is a schematic diagram of a network abstraction including a packet virtual network (PVN) for modeling multi-point to multi-point (MP2MP) packet technology services according to an embodiment of the subject matter described herein.
Figure 4A:
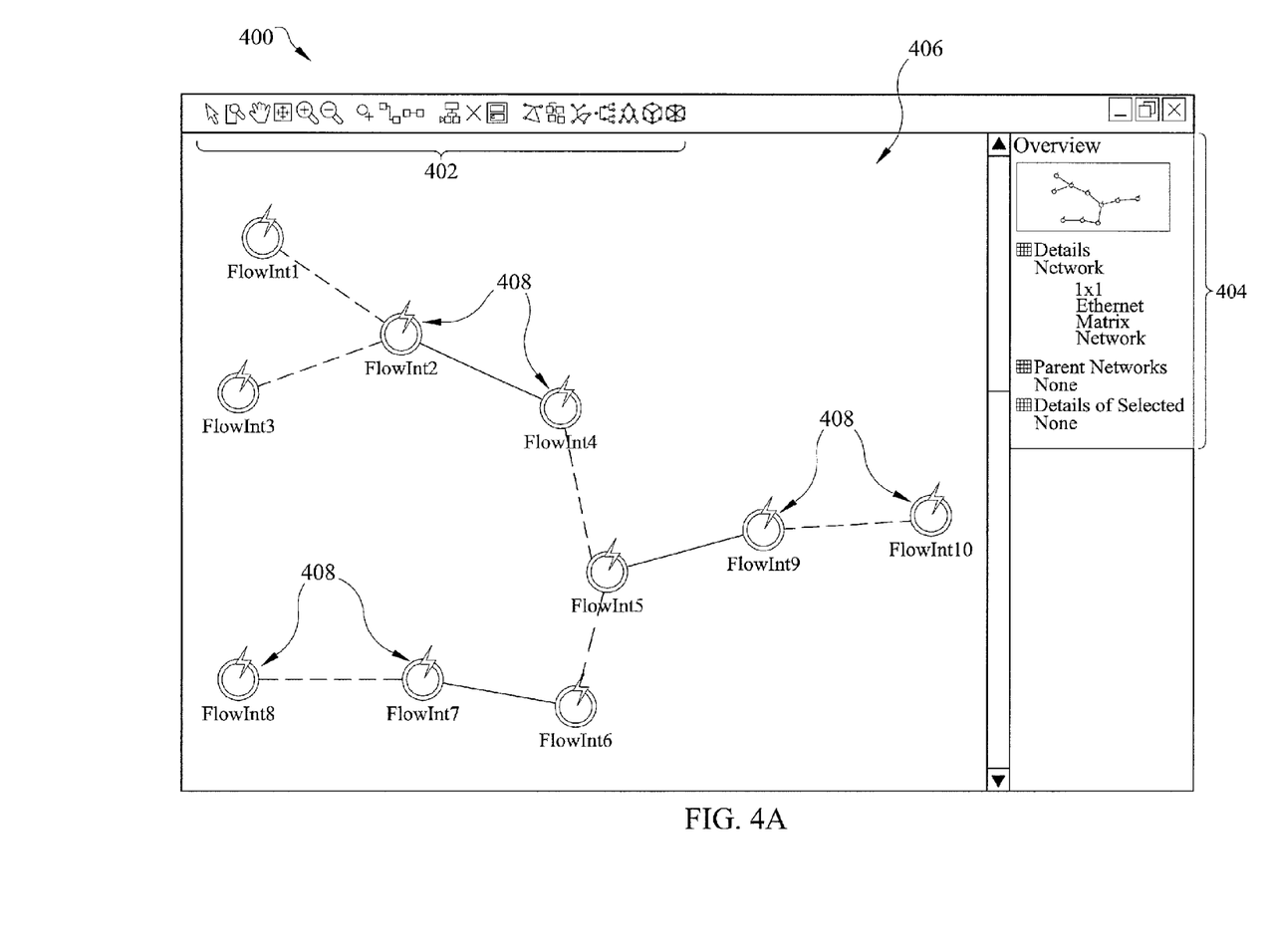
FIGS. 4A and 4B are diagrams illustrating exemplary user interfaces for modeling packet technology services using PVNs according to an embodiment of the subject matter described herein.
Figure 4B:
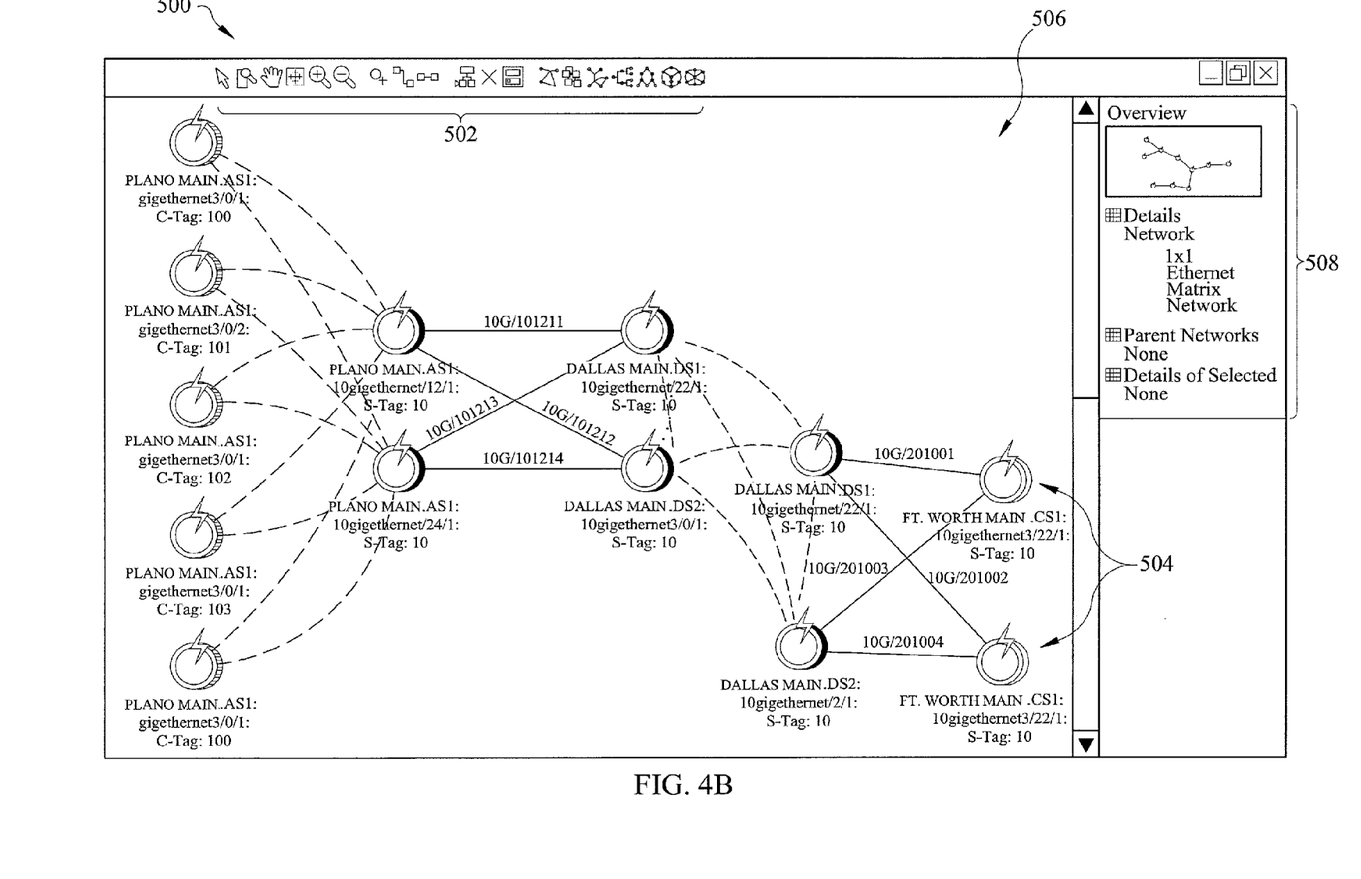

Still referring to FIG. 1A and in some embodiments, a user (e.g., operator, technician, designer, engineer, etc.) may select modeling objects or items 106A, stored as data objects, which have been pre-programmed, provisioned, or user-established and stored within modeling database 106 for use in modeling packet based services via input from a user device 108. User device 108 may include any device (e.g., a computer, tablet, web-enabled device, etc.) or computing platform accessed and/or usable by a human user or operator to instruct PVN-MM 104 to construct or generate a PVN (FIGS. 3 to 4B). In some embodiments, user device 108 may be an automated system, application, or other media controllable by a human user. A user may select and/or configure one or more modeling-related objects onto a design space (e.g., a visual, textual, or data) for modeling and/or emulation of a service network via device 108. User device 108 may include one or more user interfaces 108A by which a user interacts with PVN-MM 104 to select (e.g., add, drop, change, etc.) modeling objects/items 106A and generate a PVN (FIGS. 3 to 4A). User interface 108A may include a graphical user interface (GUI) for visually displaying a PVN model on a screen (e.g., a computer screen, tablet screen, etc.) to visualize packet based service(s), including P2P and complex MP2MP enterprise services.

In some embodiments, computing platform 102 and PVN-MM 104 may collectively include functionality for setting up, designing, and/or building a model for modeling a virtual packet technology network, designated a PVN, which is linked or mapped to and/or logically representative of an underlying infrastructure of physical devices. PVN-MM 104 is configured to generate and model representative connectivity between service nodes and edges (e.g., via flow interfaces and packet connectivity) associated with a packet service, and display a visual indication of the PVN via at least one user interface 108A. System 100 may output a visual indication of the virtual network model or emulation to a user via user device 108. Once approved, the generic PVN model is saved as a model configuration and sent to an activation engine 110 for completing a service order for a specific service network.

Figure 1B:
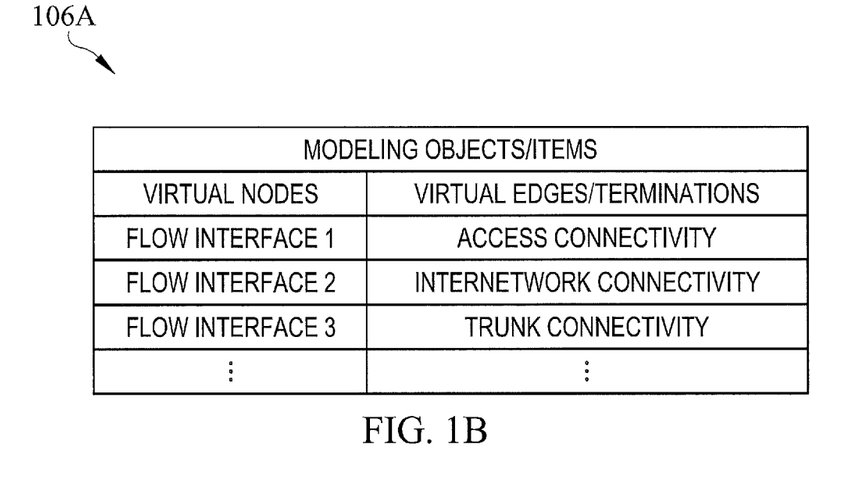
FIG. 1B is a diagram illustrating exemplary modeling objects for generating models of packet technology services according to an embodiment of the subject matter described herein.

In some embodiments, database 106 includes modeling objects or items 106A from which a PVN model is constructed. Referring now to FIG. 1B, modeling objects or items 106A include attributes associated with the flow interfaces and/or connectivity, which are optionally stored as data objects within one or more tables. Objects 106A may include data objects that are pre-configured (e.g., default or out of the box), user-defined, and/or provisioned to database 106 for logically representing physical devices for flexible modeling thereof. In some embodiments, modeling objects or items 106A include virtual nodes and virtual edges defined using attributes associated with the physical media interfaces that each represents. Such attributes may include the termination type, connectivity, rate or capacity, location, etc. As FIG. 1B illustrates, virtual nodes include flow interfaces or flow interface objects, generically denoted "FLOW INTERFACE 1", "FLOW INTERFACE 2", etc. Flow interfaces are used to provide technology independent (generic and/or agnostic) but resource-specific models of a network abstraction (e.g., PVN) for supporting packet flow inspection, shaping, and configuration at any point in a network. Flow interface objects include data structures attributes, for example, of the sub-interfaces that are logically subordinated to physical media interfaces in a network. Attributes may include, for example, location codes, flow identifiers, an indication of bit rate (e.g., rate code), and indication of the connectivity (e.g., access, trunk, internetwork), etc.

In some embodiments, flow interfaces for use in a PVN are selected, defined, and/or configured according to one or more modeling sub-objects, such as one or more flow identifiers, flow attributes, flow types/roles, settings, interface configurations, etc. Flow identifiers may include sub-objects derived from packet headers (e.g., VLAN IDs, stacking identifiers, VPI, VCI, etc.), network address domains (NADs), and flow interface configurations (e.g., flow patterns determined by tracking flow identifiers). Flow interface configurations may change over time, and be defined by various resource and/or attribute values. Exemplary data storage solutions, including database 106 for storing modeling objects or items 106A, may include non-transitory computer readable media, such as flash memory, random access memory (RAM), or other storage devices. In some embodiments, database 106 and modeling objects or items 106A may be external to and/or or integrated with computer platform 102 and/or PVN-MM 104. Modeling objects 106A may be manually selected for use in a model PVN using a sub-object identifier (e.g., NAD) or flow identifier. The flow identifiers can be assigned for use in the entire PVN or to an individual flow interface. Modeling objects and sub-objects can further divide the domain and flow identifiers can also be selected from a database 106 including a resource pool.

As FIG. 1B illustrates, PVNs may be constructed or generated using a plurality of modeling objects including either resource-based virtual nodes alone, or virtual nodes and virtual edges. Virtual nodes include flow interfaces, which are logical sub-interfaces representative of and/or mapped (linked) or otherwise indicative of existing resources. Virtual edges include different connectivity and/or terminations. For example, connectivity may be defined as access, internetwork (e.g., between two or more networks), cross connect (e.g., between two or more flow interfaces), and trunk connectivity. Flow interface "cross connects" refer to a mapping functionality associated with flow interface virtual channel and parameter mapping. Virtual nodes and/or edge resources represented in a PVN that are of interest to a service fulfillment are copied to items in the configuration when the configuration is completed. The model configuration is then sent to an activation engine (e.g., 110, FIG. 1A) for conversion to a technology dependent (specific) service. A PVN can be referenced on multiple services.

Figure 2:
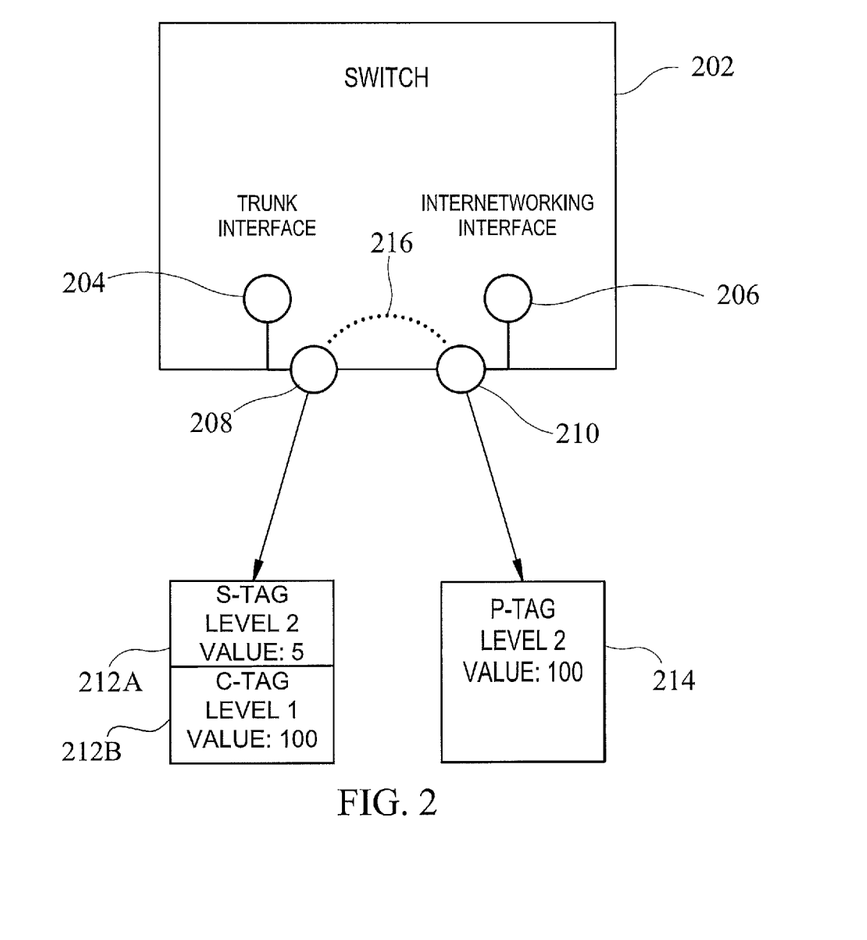
FIG. 2 is a diagram of a logical sub-interface for supporting modeling packet technology services according to an embodiment of the subject matter described herein.

FIG. 2 is a schematic diagram of an interfacing device having an associated flow interface which is a logical sub-interface, for supporting modeling of packet technology services according to an embodiment of the subject matter described herein. A flow interface includes a logical portioning or partitioning of a media interface to support a controlled flow (e.g., bit rate) of an enterprise service being delivered to a customer service location. Flow interfaces may constitute a virtual entity identified as a virtual modeling objection for generation of a PVN. The virtual entity may be extended from a network device's actual physical media interface for use as a sub-interface to track and/or manage flow identifiers (e.g., VLAN identifiers) mapped to the respective devices residing in the underlying physical infrastructure. A flow interface is associated with (e.g., mapped to) a port or media interface of a physical network device (e.g., a router, switch, hub, etc.) through which packet traffic flows.

As an example, FIG. 2 depicts a logical representation of a flow interface including an exemplary interfacing device such as a switching element (switch) 202 that is configured to utilize flow interfaces according to an embodiment of the subject matter described herein. As shown, switch 202 may include a plurality of physical hardware media interfaces, such as trunk interface 204 and internetworking interface 206, which are configured to receive and send packet traffic communications. Each of trunk interface 204 and internetworking interface 206 may be associated with a physical device interface (e.g., an underlying physical port) that is adapted to receive the packet traffic communications at the physical layer. Notably, each of interfaces 204 and 206 may be respectively logically partitioned by the CSP to include one or more flow interfaces.

As illustrated in FIG. 2, a flow interface 208 may be configured on trunk interface 204 and flow interface 210 may be configured on internetworking interface 206. Each flow interfaces 208 and 210 may be designed and generated by a CSP host server (not shown), which in turn systematically provisions the flow interfaces to receiving network elements. In some embodiments, a CSP host server (not shown) may send activation commands, which contain flow interface information, to network elements designated for fulfilling the requested enterprise service. For example, upon receiving an activation command including a flow interface from a CSP host server, switching element 202 may configure a media interface (e.g., one of interfaces 204, 206 as specified in the activation command) in accordance to the contained flow interface information. For example, the received flow interface information may include a port identifier, a flow interface bit rate, and a flow identifier (as shown by flow identifiers 212A, 212B and 214 in FIG. 2). Using the flow interface information, switching element 202 may configure a flow interface that is capable of establishing connectivity at the specified bit rate on a media interface associated with the port identifier. As additional flow interfaces are configured on switching element 202, two or more flow interfaces may be logically linked together to form a flow cross-connect (e.g., cross-connect 216) that serves to implement the enterprise service. A plurality of flow identifiers (e.g., 212A, 212B and 214) associated with a plurality of flow interfaces (e.g., 208, 210) may be populated and/or provisioned to a database (e.g., 106, FIG. 1A) for use in identifying and/or selecting flow interfaces during modeling.

FIG. 3 is schematic illustration of a system, generally designated 300, used to flexibly model a MP2MP service (e.g., enterprise service). System 300 includes a PVN 302 comprised of a collection of flow interfaces 304, which are generically illustrated as dots for illustration purposes. Flow interfaces 304 are virtual modeling objects, which are mapped or otherwise representative of an existing device parent (e.g., a media interface of a parent device such as 202, FIG. 2) and/or one or more sub-interfaces of the existing device parent. Flows interfaces 304 are resource based for modeling or emulation virtual interfaces through which data packets flow for a given service. PVN 302 includes a single, virtual network unit by which services (or one leg of a service) may be modeled efficiently for a variety of CSPs, regardless of the type of packet based technology (e.g., Ethernet and non-Ethernet). PVN 302 generically models packet connectivity nodes (flow interfaces 304) and edges (access, internetwork, and/or trunk connectivity) for any type of packet based technology.

PVN 302 is configured to connect one or more customer and/or service locations 306A, 306B, 306C together in a multi-point connectivity design. Locations 306A, 306B, 306C are schematically illustrated by generic map icons/locations for representing the customer facing originating point (e.g., 306A) and service points (e.g., 306B, 306C) for a service. Locations 306A, 306B, 306C are indicative of "customer sites" and/or "network service locations". The customer sites and/or network service locations can include a city and, for example, house or a building with an address inside a city. In general, a service location includes a house or a building with only an address identifying it. Customer sites and service locations may be identified using a network location code, such as "PLANO MAIN", see e.g., FIG. 4B. Each location code may include a string of alpha or numeric symbols for representing a city (e.g., "PLANO"=Plano, Tex.) a main service location (e.g., generically designated "MAIN"), which would then have an address and geographic coordinates.

In some embodiments, PVN 302 ties the different components together into a single model for visually depicting the connectivity and design of a multipoint enterprise service, which includes, inter alia, locations 306A, 306B, 306C, access connections 310A, 310B, 310C, device interfaces (e.g., flow interfaces 304), provider edge devices (e.g., routers 308A, 308B, 308C), etc. As FIG. 3 further illustrates, PVN 302 may terminate a first access connectivity 310A at a first network device, such as a router 308A, which is customer facing. PVN 302 may terminate a second access connectivity 310B at a second network device, such as a router 308B, which is provider facing (e.g., at a service location). PVN 302 may terminate a third access connectivity 310C at a third network device, such as a router 310C, which is also provider facing (e.g., at a service location). Each access connectivity 310A, 310B, and 310C may include any type of suitable interface, not limited to a User Network Interface (UNI). However, any type of access interface may be provided.

In some embodiments, PVN 302 is created with a network configuration, so that resources represented in the network of interest to service fulfillment are copied to items in the configuration when the configuration is completed for sending to an activation engine (e.g., 110, FIG. 1A). PVN 302 can be referenced on multiple services. In some embodiments, users are able to create their own specifications for modeling objects used to generate PVN 302, using a design or studio type of program via a user interface. PVN 302 may also be visually (graphically) depicted to a user, as indicated by FIGS. 4A and 4B.

FIGS. 4A and 4B are illustrations of exemplary user interfaces (UI), generally designated 400 and 500, respectively, for modeling a packet technology service (Ethernet or non-Ethernet) via configuring and/or generating one or more PVNs. In some embodiments, the modeling module or platform (e.g., 102, FIG. 1A) may include a GUI for visually or graphically displaying a model P2P and/or MP2MP service to a human/user. In some embodiments, configuring a PVN using modeling objects may include configuring one or more data structures or objects representing virtual sub-interfaces (e.g., flow interfaces) and/or connectivity (e.g., cross connects or access/trunk/interconnect connectivity) thereof, as described in FIG. 2 above. For example, configuring a flow interface object may include modifying, deleting, adding, creating, generating, etc. one or more attributes associated therewith, such as a location code, rate code, tag (identification code), etc.

As noted above, PVNs utilize virtual nodes, including flow interfaces. In some embodiments, flow interfaces may be pre-configured and accessed from a storage medium (e.g., a recess pool or database) using an out of the box version of a modeling module (e.g., PVN-MM 104, FIG. 1) or package. In other embodiments, flow interfaces may be defined by the modeling user using a modeling toolbar 402, for example, by utilizing drop down boxes to specify and/or select aspects of a flow interface, such as the technology (e.g., ATM, Ethernet, Frame Relay, IP, etc.), termination type (e.g., access, trunk, internetwork, etc.), flow identifier, cross connect, etc.

Flow identifiers (e.g., VLAN IDs, etc.) provide a mechanism for tracking different types of virtual channel identifiers based on different types of underlying technology. UI 400 allows users to define their own business specific names for flow identifiers using one or more tools available in an interactive toolbar 402. The user-specific flow interfaces may be configured into flow interface objects which can be selected from a recess pool or database can be pulled into a design or canvas area 406 to create and generate a PVN. Details regarding the PVN (e.g., the type of network, etc.) are provided in an optional overview box or display portion 404 of UI 400, which has the option of being hidden from view and/or downsized.

UI 400 visually depicts a PVN as a collection of flow interfaces 408. Each flow interface may be graphically or visually represented by a visual symbol or identifier. The user can add multiple flow interfaces and connectivities (e.g., cross connects) or terminations (e.g., access connectivity/termination, trunk connectivity/termination, internetwork connectivity/termination) to canvas 406 one at a time by selecting such objects of items from toolbar 402.

Flow interfaces 408 may visually indicate the termination type to indicate the purpose of the interface. For example, PVN includes a collection of flow interfaces, where each flow interface is illustrated in terms of the connectivity it terminates. Termination type may be indicated by design (see e.g., the Legend in FIG. 4C), color, or symbology. In addition to this, connectivity between interfaces may be visually differentiated. For example, cross connects (e.g., jumpers or connections between two flow interfaces) may be indicated in solid lines, and other connections (e.g., trunk, access, etc.) may be indicated in broken lines. Cross connects may be built into the system for querying and/or defined by the model user and stored in a modeling object database. Cross connects may also be defined and stored as modeling objects contained in a table or database (see e.g., FIG. 1B).

In some embodiments, PVNs may be configured as a user initiates a search for available interfaces of the termination type needed (e.g., trunk, access, internetwork, etc.), then selects or adds flow interfaces 408 from a drop down toolbar 402 to canvas 406. Flow interfaces 408 may be selected and cross connected to other flow interfaces 408. As more flow interfaces 408 are added and connected, a PVN is generated and/or configured. As each flow interface 408 is a logical sub-interface of a parent media interface, once a model user is satisfied with the service design, the agnostic model can be configured as a data object and passed to an activation engine for converting the technology-independent model (e.g., PVN) to a technology specific service network.

FIG. 4B is another embodiment of a visual or graphical indication of a PVN displayed via an exemplary UI 500 (e.g., GUI). PVN is generated and/or configured via selection of a plurality of modeling objects (e.g., virtual nodes (flow interfaces) and virtual edges (termination or connectivity objects)) by adding virtual objects via an interactive toolbar 502. Toolbar 502 allows one or more flow interfaces 504 to be added to a canvas area or design space 506. An overview of the PVN is shown and described to a model user via an optional (e.g., the option to view or hide) overview box or display portion 508.

In some embodiments, model users, via UI 500, may "add" or "create" flow interface objects, network edge objects, and/or associate the connectivity there between via "associate connectivity" options from toolbar 502. The user may define connectivity between virtual nodes (i.e., flow interfaces 504) by selecting "Access" for network access connectivity, "Internetwork" for packet connectivity marked as internetworking, "Trunk" for packet network connectivity (e.g., each of which is a connectivity object), and/or "Cross Connect". Notably, UI 500 provides a simple click-and-go approach for service modeling, design, configuration, and/or packet connectivity for all major packet based domains. Modeling objects may be identified as default data structures or objects, user-defined data structures or objects, and/or provisioned data structures or objects and stored within a storage medium accessible by a model/modeling user via a computing platform (e.g., 102, FIG. 1A).

Figure 4C:
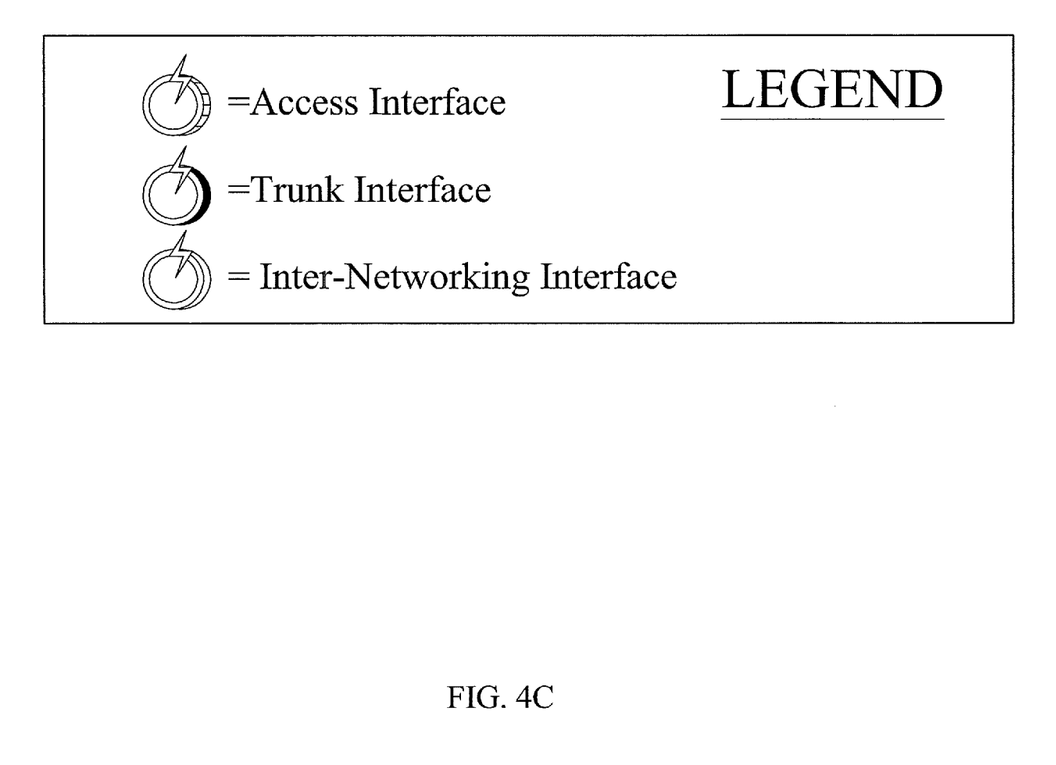
FIG. 4C is a legend for the diagram illustrated in FIG. 4B according to an embodiment of the subject matter described herein.

As the "Legend" in FIG. 4C illustrates, the flow interface 504 icons or symbols of FIG. 4B may be color-coded or otherwise visually differentiated based upon the type of termination or interface being modeled. Flow interfaces 504 may be differentiated with respect to access connectivity via an access interface, trunk connectivity via a trunk interface, and internetworking connectivity via internetworking interfaces. The Legend appearing in FIG. 4C is for illustration purposes, and may or may not be an actual visual aspect appearing on canvas 506.

Access connectivity via an access interface indicates that the purpose of the respective flow interface 504 is to terminate connectivity that provides access to the provider's network (e.g., and is customer facing), such as Ethernet UNI connectivity. Internetwork connectivity indicates that the purpose of the respective flow interface 504 is to terminate connectivity that interconnects two networks. Trunk connectivity indicates that the purpose of the respective flow interface 504 is to terminate connectivity between service provider equipment within a same network.

User may utilize UI 500 to display (or optionally hide) detail(s) regarding each flow interface 504, where desired. For example and as described in regards to in FIG. 2, flow interfaces 504 may include an ID indicating a customer and/or service location (e.g., a location code). For example, the identifiers "PLANO MAIN" (e.g., Plano Main AS1), "DALLAS MAIN" (e.g., Dallas Main DS1), and "FT. WORTH MAIN" (e.g., Ft. Worth Main CS1) are indicative of location codes for media interfaces/access points in Plano, Dallas, and Ft. Worth Tex., respectively. Each may be a customer and/or provider site having physical interfaces (e.g., media interfaces) that are logically represented using flow interfaces 504. Service locations may be imported from a pre-populated pool of default modeling objects, provisioned, and/or selected from a user-defined set of modeling objects.

Each flow interface 504 identifier visually depicted within PVN may further indicate the rate code (bit-rate or bit-rate code) of the parent media interface. For example the term "GIGE" in the flow interface 504 indicates a 1G parent media interface.

Each flow interface 504 identifier used in PVN may further indicate flow identifiers associated with each parent interface. For example, flow identifier's may include specific parameters such as VLAN IDs, VCIs, VPIs, etc., or generic customer and service "TAGs" (e.g., customer tag="C-TAG"; service tag="S-Tag"). Flow interface 504 identifiers (e.g., "PLANO MAIN.ASI:gigethernet3/0/1:C-Tag:100", et al.) may be shown or hidden, and/or allow a user to drill down further and display the actual device media interfaces/identifiers.

The connectivity between each flow identifier may also be optionally displayed. For example, the term "10G/101211" identifies a connectivity (e.g., connectivity object) for trunk and internetworking flow interfaces 504, which includes a 10G channel. Connectivity objects may also be stored within a table and/or database for querying, access, and modeling in a design space. Other flow paths (e.g., indicated in broken lines) may transport packets along non-specific paths and/or logical cross connects.

In some embodiments, a drop down toolbar 502 may allow a user to select modeling objects for display on canvas 506 for generating a PVN. Modeling objects, including virtual nodes and edges (FIG. 1B), may be selected from default data having out of the box objects or from predetermined or provisioned (e.g., previously created, user-defined objects) pool of resources. Each object may be a logical sub-interface associated with an existing media interface. This modeling approach allows a simplified and effective "click-and-go" approach regarding a packet service network design and configuration.

When modeling via systems and methods described herein, one or more rules may be pre-programmed by default within the systems and/or methods for use by model users upon interacting with UI 500. This allows for more robust and efficient modeling. For example, in some aspects UI 500 may provide, by default, that: (i) an internetwork flow interface can only be cross-connected to a trunk interface; (ii) a trunk interface can be cross connected to another trunk interface, (iii) an access interface cannot connect to another access interface; (iv) two flow interfaces cannot be cross connected under the same media interface; (v) only two flow interfaces can be selected; and (vi) the cross connects must be on the same logical device. After a PVN is designed and modeled, the modeling user may then validate the design prior to sending it out for activation. Any other modeling rules and/or guidelines may be provide by default, where desired.

Figure 5:
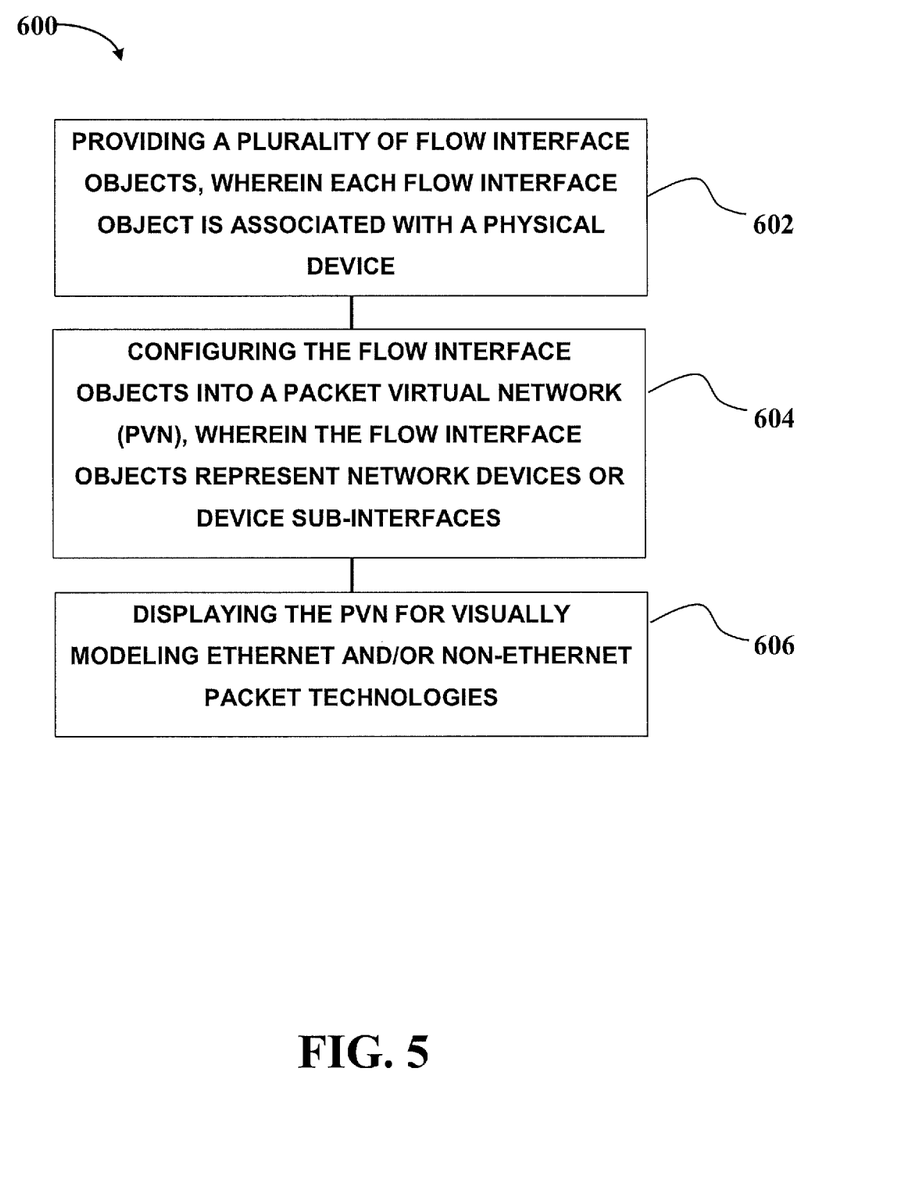
FIG. 5 is a diagram illustrating an exemplary process for modeling a packet technology service according to an embodiment of the subject matter described herein.

FIG. 6 is a diagram illustrating an exemplary process, generally designated 600, for modeling packet technology services using a PVN. In some embodiments, exemplary process 600, or portions thereof, may be performed by or at a computing platform (e.g., 102, FIG. 1A), a modeling module (e.g., PVN-MM 104, FIG. 1A), and/or across several computing platforms and/or modules.

At block 602, a plurality of flow interface objects are provided, and each flow interface object is associated with a physical device. Flow interface objects may include modeling objects (e.g., 106A, FIG. 1B), such as data objects stored within and/or accessed using a PVN modeling module. Flow interface objects may be pre-configured out of the box, user defined, provisioned, and/or accessed from a pool of network resources. Connectivity objects may also be provided and/or configured for representing flows (edges) between flow interface (node) objects (e.g., access, trunk, and/or inter-network nodes) within the PVN. Connectivity objects may include data structures of various attributes, including an identification code (e.g., the name/identifier of a port or channel), a transmission rate code (e.g., 1G, 10G, 40G, etc.), or a termination type (e.g., trunk, access, internetwork). As illustrated by FIG. 2 above, flow interfaces are generally associated with and/or include a logical sub-interface of an existing (physical) parent device (e.g., 202, FIG. 2), such as a router or switch.

At block 604, the flow interface objects are configured into a PVN. The flow interface objects are configured and/or visually connected or grouped for representing network devices (e.g., or device sub-interfaces thereof) and/or connectivity within an underlying infrastructure modeled by the PVN. Configuring the flow interface objects may include textually and/or visually configuring the objects into PVN modeling objects (data objects). Flow interfaces may be configured by adding, deleting, changing, modifying, and/or replacing one or more attributes associated with the flow interfaces, such as a location code, flow identifier, rate code, etc. Flow interface objects may also be stored, accessed, and visually configured into a group, for providing a PVN model.

In block 608, the PVN is displayed for visually modeling Ethernet and/or non-Ethernet packet technologies. PVN is an agnostic network abstraction, and technology independent. PVN utilizes generically defined "flow interfaces" for logically representing the underlying technology, using a technology-independent data structure or object.

In some embodiments, a flow interface object, a packet connectivity object, a termination objection and/or sub-objects thereof (e.g., flow identifiers, trunk connectivity, access connectivity, internetwork connectivity, technology type, etc.) may be used for modeling and/or emulating packet based services via configuring the objects into a PVN or PVN model. In some embodiments, each object may be selected from a plurality of stored modeling objects. In some embodiments, each object may be pre-configured or customizable via a user interface.

It should be noted that computing platform (e.g., 102, FIG. 1A), PVN-MM (e.g., 104, FIG. 1A), and/or functionality described herein may constitute a special purpose computing device. Further, computing platform (e.g., 102, FIG. 1A), PVN-MM (e.g., 104, FIG. 1A) and/or functionality described herein can improve the technological field of packet flow inspection, shaping, and/or configuration at any access point in a packet based service network via modeling. In addition to this, visual design support and/or adequate modeling for complex multipoint-to-multipoint (MP2MP) services for all major packet based domains is provided.

The subject matter described herein for modeling packet technology services using a PVN improves the functionality of enterprise services and/or packet based service applications and related computing platforms by providing for more efficient (technology dependent) modeling services that improve user experiences and productivity. It should also be noted that a computing platform that implements the subject matter described herein may comprise a special purpose computing device usable to generate a visual model for one or more packet based services.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for modeling a packet technology service, the method comprising:
   at a computing platform:
      providing a plurality of flow interface objects, wherein each flow interface object is associated with a physical device;
      configuring the flow interface objects into a packet virtual network (PVN), wherein the flow interface objects represent network devices or device sub-interfaces; and
      displaying the PVN for visually modeling an Ethernet and/or a non-Ethernet packet technology service, wherein displaying the PVN includes displaying the PVN on a computer screen, and wherein the flow interface objects are visually distinguishable on the computer screen based upon a termination type by virtue of displaying different graphical indicators for each of a plurality of different termination types.

2. The method of claim 1, wherein providing a plurality of flow interface objects comprises providing a plurality of data structure attributes, and wherein the attributes include at least one of a location code, a bit-rate code, or an identification code.

3. The method of claim 1, wherein configuring the flow interface objects into the PVN includes adding, deleting, modifying, or creating data structures.

4. The method of claim 1, further comprising providing a plurality of connectivity objects.

5. The method of claim 4, wherein providing the plurality of connectivity objects comprises providing a plurality of data structure attributes in a table or a resource pool.

6. The method of claim 5, wherein the plurality of data structure attributes associated includes at least one of a transmission rate code or an identification code.

7. The method of claim 1, wherein configuring the flow interface objects into the PVN comprises modeling the connection of infrastructure at one or more physical client service locations to infrastructure of a service provider network of a Carrier Service Provider (CSP).

8. The method of claim 1, wherein displaying on the computer screen different graphical indicators for each of a plurality of different termination types comprises displaying a first graphical indicator for each of a first plurality of flow objects representing access interfaces, displaying a second graphical indicator for each of a second plurality of flow objects representing trunk interfaces, and displaying a third graphical indicator for each of a third plurality of flow objects representing internetwork interfaces.

9. The method of claim 1, wherein the physical device includes a router or a switch.

10. The method of claim 1, wherein the packet technology service includes an Internet service, a Web service, a streaming service, an Electronic-Mail (E-Mail) service, a phone service, a Voice over IP (VoIP) service, a Direct Internet Access (DIA) service, an Internet Protocol (IP) Television (IPTV) service, or a Virtual Private Network (VPN) service.

11. The method of claim 1, wherein configuring the flow interface objects into the PVN comprises assigning the flow interface objects to specific physical resources of a service provider's network using technology-independent attributes.

12. The method of claim 1, comprising saving the PVN as a model configuration and sending the model configuration to an activation engine for conversion to a technology-dependent service and for completing a service order for a specific service network.

13. A system for modeling a packet technology service, the system comprising:
   a computing platform comprising at least one processor and a memory, wherein the computing platform is configured to access a plurality of flow interface objects stored in the memory, each flow interface object being associated with a physical device; and
   a packet virtual network (PVN)-modeling module (PVN-MM) configured to group the flow interface objects into a PVN, wherein the flow interface objects represent network devices or device sub-interfaces, and wherein the PVN-MM is configured to visually display on a computer screen the PVN to model an Ethernet and/or a non-Ethernet packet technology service, and wherein the flow interface objects are visually distinguishable on the computer screen based upon a termination type by virtue of displaying on the computer screen different graphical indicators for each of a plurality of different termination types.

14. The system of claim 13, wherein the plurality of flow interface objects includes a plurality of data structure attributes, and wherein the attributes include at least one of a location code, a bit-rate code, or an identification code.

15. The system of claim 13, wherein the flow interface objects are grouped into the PVN via an access connectivity, a trunk connectivity, a cross connectivity, or an internetwork connectivity.

16. The system of claim 13, further comprising a plurality of connectivity objects stored in the memory.

17. The system of claim 16, wherein the plurality of connectivity objects includes a plurality of data structure attributes stored in a table or a resource pool.

18. The system of claim 17, wherein the plurality of data structure attributes includes at least one of a transmission rate code or an identification code.

19. The system of claim 13, wherein the display includes a computer screen and wherein the flow interface objects are visually distinguishable based upon a termination type wherein the PVN-MM is configured for configuring the flow interface objects into the PVN by modeling the connection of infrastructure at one or more physical client service locations to infrastructure of a service provider network of a Carrier Service Provider (CSP).

20. The system of claim 13, wherein displaying on the computer screen different graphical indicators for each of a plurality of different termination types comprises displaying a first graphical indicator for each of a first plurality of flow objects representing access interfaces, displaying a second graphical indicator for each of a second plurality of flow objects representing trunk interfaces, and displaying a third graphical indicator for each of a third plurality of flow objects representing internetwork interfaces.

21. The system of claim 13, wherein the physical device includes a router or a switch.

22. The system of claim 13, wherein the packet technology service includes an Internet service, a Web service, a streaming service, an Electronic-Mail (E-Mail) service, a phone service, a Voice over IP (VoIP) service, a Direct Internet Access (DIA) service, an Internet Protocol (IP) Television (IPTV) service, or a Virtual Private Network (VPN) service.

23. The system of claim 13, wherein the PVN-MM is configured for assigning the flow interface objects to specific physical resources of a service provider's network using technology-independent attributes.

24. The system of claim 23, wherein the PVN-MM is configured for saving the PVN as a model configuration and sending the model configuration to an activation engine for conversion to a technology-dependent service and for completing a service order for a specific service network.

25. A non-transitory computer readable medium comprising computer executable instructions embodied in the computer readable medium that when executed by a processor of a computer perform steps comprising:

providing a plurality of flow interface objects, wherein each flow interface object is associated with a physical device;

configuring the flow interface objects into a packet virtual network (PVN), wherein the flow interface objects represent network devices or device sub-interfaces; and displaying the PVN for visually modeling an Ethernet and/or a non-Ethernet packet technology service, wherein displaying the PVN includes displaying the PVN on a computer screen, and wherein the flow interface objects are visually distinguishable on the computer screen based upon a termination type by virtue of displaying different graphical indicators for each of a plurality of different termination types.

* * * * *

UNITED STATES PATENT AND TRADEMARK OFFICE
CERTIFICATE OF CORRECTION

PATENT NO. : 9,674,045 B2
APPLICATION NO. : 14/569406
DATED : June 6, 2017
INVENTOR(S) : Latham et al.

Page 1 of 1

It is certified that error appears in the above-identified patent and that said Letters Patent is hereby corrected as shown below:

On the Title Page

Column 2, under Abstract, Line 15, delete "PVN)" and insert -- PVN --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*